United States Patent [19]
Spedding et al.

[11] Patent Number: 4,927,124
[45] Date of Patent: May 22, 1990

[54] SPRING ASSEMBLIES

[75] Inventors: Colin E. Spedding, Wolverhampton; Andrew Pollard, Bridgnorth, both of United Kingdom

[73] Assignee: GKN Technology Limited, West Midlands, England

[21] Appl. No.: 269,538

[22] PCT Filed: May 7, 1987

[86] PCT No.: PCT/GB87/00299
§ 371 Date: Dec. 2, 1988
§ 102(e) Date: Dec. 2, 1988

[87] PCT Pub. No.: WO87/06986
PCT Pub. Date: Nov. 19, 1987

[30] Foreign Application Priority Data
May 9, 1986 [GB] United Kingdom ............... 8611340

[51] Int. Cl.⁵ .................... F16F 1/36; F16F 13/00; B60G 3/14; B60G 15/06
[52] U.S. Cl. .................................. 267/229; 267/31; 267/36.1; 267/165; 267/149; 267/260; 267/227
[58] Field of Search ............... 267/227, 229, 241, 244, 267/31, 32, 36.1, 47, 53, 260, 262, 148, 149, 151, 158, 160, 164, 165, 264

[56] References Cited
U.S. PATENT DOCUMENTS

| | | |
|---|---|---|
| 315,176 | 4/1885 | Smith . |
| 662,876 | 11/1900 | Parfrey . |
| 1,083,734 | 1/1914 | Dunn . |
| 2,063,216 | 12/1936 | Zaparka et al. . |
| 2,594,665 | 4/1952 | Lockwood . |
| 3,434,707 | 3/1969 | Raidel . |
| 4,206,808 | 6/1980 | Kreft . |
| 4,678,204 | 7/1987 | Hetherington ............... 267/31 X |
| 4,801,019 | 1/1989 | Smolen, Jr. ..................... 267/149 X |
| 4,832,320 | 5/1989 | Scowen et al. ................ 267/165 X |

FOREIGN PATENT DOCUMENTS

| | | |
|---|---|---|
| 2084691 | 4/1982 | United Kingdom . |
| 8500207 | 1/1985 | World Int. Prop. O. . |
| 0135807 | 4/1985 | World Int. Prop. O. . |
| 8604124 | 7/1986 | World Int. Prop. O. . |
| 8700252 | 1/1987 | World Int. Prop. O. . |
| 8706986 | 11/1987 | World Int. Prop. O. ........ 267/148 |

Primary Examiner—Douglas C. Butler
Attorney, Agent, or Firm—Marshall, O'Toole, Gerstein, Murray & Bicknell

[57] ABSTRACT

Assembly comprising a spring in the form of a zig-zag strip of fibre reinforced plastics material with limbs (10-16) connected by reflex portions (17,22), wherein end limbs (10,16) of the spring are mounted at an attitude they would adopt when loaded if they were pin-jointed so as to be free to move as the spring is loaded so that over-stressing of the reflex portions (18,21) of the spring is thereby avoided when the spring is loaded. In modifications of the invention, a spring end limb (39) may be progressively engaged by a surface (42) of a mounting to be supported at a range of attitudes corresponding to a range of spring loads; or a spring mounting may be associated with pivotable members so that end limbs of the spring move arcuately therewith and change their relative attitude as if they were pin-jointed.

7 Claims, 2 Drawing Sheets

SPRING ASSEMBLIES

This invention relates to springs comprising a strip of fibre-reinforced plastics material of zig-zag configuration, having a plurality of limbs connected by reflex portions and the longitudinal centre line of the strip lying substantially in a single plane. Such springs, which will hereafter be referred to as springs of the kind specified, are disclosed in International Patent Application Publication No. WO85/00207. More particularly, the invention relates to arrangements by which such springs can be mounted for use.

Springs of the kind specified have been proposed for use in motor vehicle suspension systems, where the properties of such springs can be advantageous. As compared with steel coil springs, currently widely used in vehicle suspensions, springs of the kind specified can lead to a reduction in weight and certain installation advantages resulting from the reduced space occupied by the springs. A spring of the kind specified is used as a compression spring, loaded between mounting components secured to opposite end limbs of the spring. When the spring is loaded, the limbs thereof are moved closer together.

The problem the present invention aims to overcome will now be described with reference to FIGS. 1, 2 and 3 of the accompanying drawings, showing diagrammatically a spring of the kind specified.

The spring of the kind specified shown in FIG. 1 comprises a plurality of limbs 10, 11, 12, 13, 14, 15, 16, joined by reflex portions 17, 18, 19, 20, 21, 22. As manufactured, limbs 10, 12, 14 and 16 are substantially parallel to one another. Limbs 11, 13, 15 are parallel to one another and inclined to the other limbs. To use the spring in, for example, a vehicle suspension, the end limbs 10, 16 thereof are held captive within mounting members 23, 24. Hitherto it has been usual to orient such mounting members 23, 24 to suit the orientation of end limbs 10, 16 as the spring is manufactured and when no stress is applied thereto.

FIG. 2 illustrates diagrammatically the shape assumed by the spring when it has been loaded by opposed forces applied to the mounting members 23, 24, as indicated by arrows 25. The force is sufficient to cause compression of the spring along its length as a whole such that limbs 12, 13 and 14 lie substantially parallel to one another. However, because mounting members 23, 24 remain in the same orientation as when the spring is unloaded, they cause the reflex portions 18, 21 to be deformed to a greater extent than the other reflex portions. With increasing distance from reflex portion 18, limb 11 approaches limb 12 and with increasing distance from reflex portion 21 limb 14 approaches limb 15.

This has led to premature failure of springs, particularly at reflex portions 18, 21.

If the spring were not held with its end limbs 10, 16 in a fixed orientation, i.e. if limbs 10, 16 were pin jointed at their mid points as shown in FIG. 3, for pivotal movement about respective axes 26, 27 perpendicular to the plane of the drawing, the spring would be deformed as shown in FIG. 3 with all the reflex portions being deformed equally and the limbs all being parallel to one another at a particular value of applied load. Such pin jointing or pivotal mounting of the end limbs of a spring is not however possible in practice because the spring would be unstable, i.e. would have a tendency to become displaced transversely of the direction in which it is loaded.

It is the object of the present invention to overcome or at least reduce the problems above described.

The present invention therefore provides an assembly comprising a spring in the form of a strip of fibre-reinforced plastics material of zig-zag configuration, having a plurality of limbs connected by reflex portions with the longitudinal centre line of the strip lying substantially in a single plane; and mounting means holding end ones of said limbs so that the spring acts resiliently therebetween, wherein the mounting means of at least one of said end limbs holds the respective limb at an attitude which it would assume at least one value of spring load in use, if such limb were pin-jointed to allow changes in attitude of the limb in use.

When a spring is in use in a vehicle suspension, it is subject to some load under all normal conditions of use. Rarely if ever will the spring completely be unloaded, unless the vehicle is jacked up with its wheels free of the ground or the dynamic condition of maximum suspension rebound is reached when the vehicle is being driven. In an assembly according to the invention, as applied to a vehicle suspension, the or both of the end limbs of the spring are held by the mounting means at an attitude which such limb or limbs would adopt, if pin jointed as above described, at a representative value of spring load in use. It will be appreciated that such attitude will be different from the or each limb's attitude when the spring is in the free state, i.e. subject to no load. When the spring is loaded in use, the above described excessive deformation of some of the reflex portions of the spring is reduced, so that spring life is enhanced.

In contrast the prior art above referred to only discloses mounting end limbs of a spring of the kind specified at their unloaded attitude in which they have been manufactured.

Preferably said end limb is held at an attitude corresponding to a mean value of spring load in use. Thus, in the case of a spring intended for use in vehicle suspension, at least one and preferably both end limbs thereof would be mounted at an orientation which would correspond to a mean spring load based on a range of vehicle loading conditions likely to be encountered in use.

By mounting the spring end limbs at orientations corresponding to a mean spring load, it is ensured that the undesirable deformation of the spring is minimised for the greatest possible proportion of the spring's service. Since a spring of the kind specified will normally be designed that at such mean value of spring load all its limbs are parallel to one another and perpendicular to the direction of loading of the spring (i.e. the direction in which the end limbs thereof move relative to one another), the or each end limb of the spring may be held by the mounting means at an attitude which is substantially perpendicular to such direction of loading. When the spring is in the free state and unconstrained by the mounting means, the end limb or limbs may be inclined to such direction.

In a further development of the invention, the mounting means may include a surface arranged to be progressively engaged by the respective limb to support a part of the limb over a range of attitudes corresponding to a range of spring loads in use. This enables the reflex portions of the spring to be loaded as if the end limbs thereof were pin-jointed over a range of spring loads in use, instead of at one selected load.

In yet a further development of the invention, the mounting means may be connected to members which are pivotable relative to one another, so that the mounting means undergo a relatively arcuate movement in use and the limbs held thereby undergo a change in relative attitude which substantially corresponds to that which they would undergo if they were pin-jointed to such members. In this case, provided the spring has been designed such that its shape and dimensions appropriately correspond to the relative movement of the pivoted members, deviation of the spring in use from the theoretically ideal pin-jointed condition can be minimised, or possibly even reduced to zero.

An assembly according to this aspect of the invention can with advantage be applied to a motor vehicle suspension where the spring is connected between a part of the vehicle's chassis structure and a pivoted arm which carries or is connected to a wheel of a vehicle.

The invention will now be described by way of example with reference to further figures of the accompanying drawings, whereof:

Figure 1:
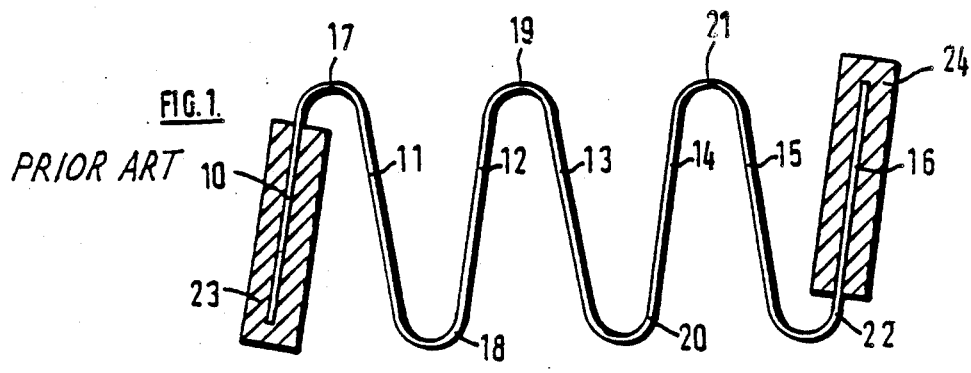
Figure 2:
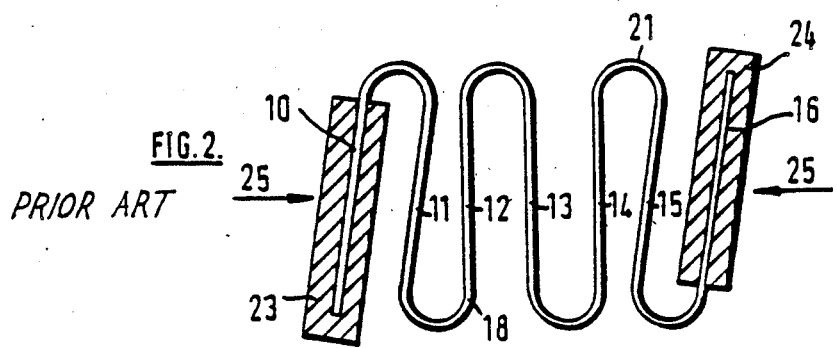
Figure 3:
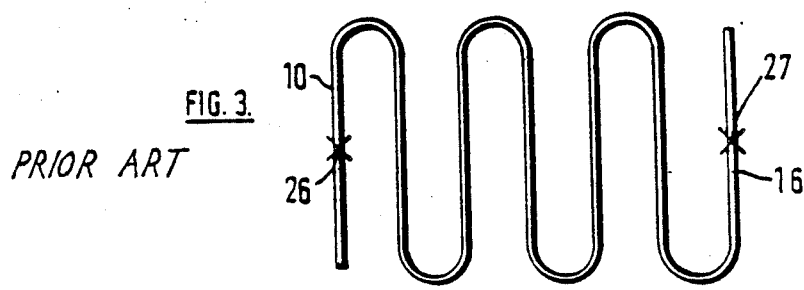
Figure 4:
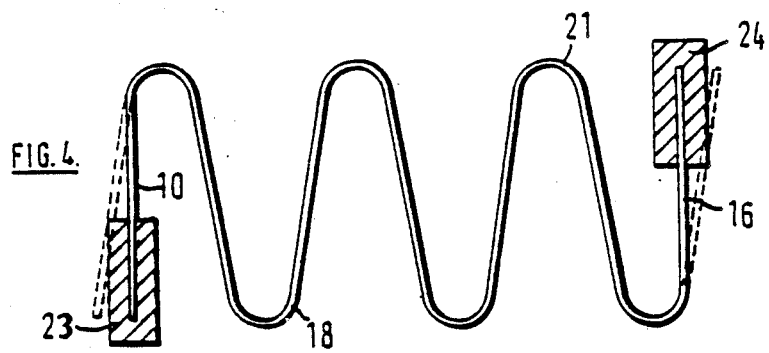
FIG. 4 shows the invention diagramatically, for a spring as that of FIGS. 1 to 3 of the drawings.

Referring firstly to FIG. 4 of the drawings, this shows a spring which, as manufactured and when not subject to any load, is of the same shape as the spring shown in FIG. 1, i.e. the end limbs 10, 16 are in the orientation shown in broken lines in FIG. 4. According to the invention, such end limbs are held in mounting members 23, 24 in the orientation shown in full lines in FIG. 4, i.e. corresponding to the attitude of such limbs at a mean value of spring loading if the limbs were pin-jointed as in FIG. 3. Then, in use, the reflex portions 18, 21 are not unduly stressed when the spring is loaded to compress it to the extent shown in FIG. 3, so that all the limbs of the spring are parallel.

Figure 5:
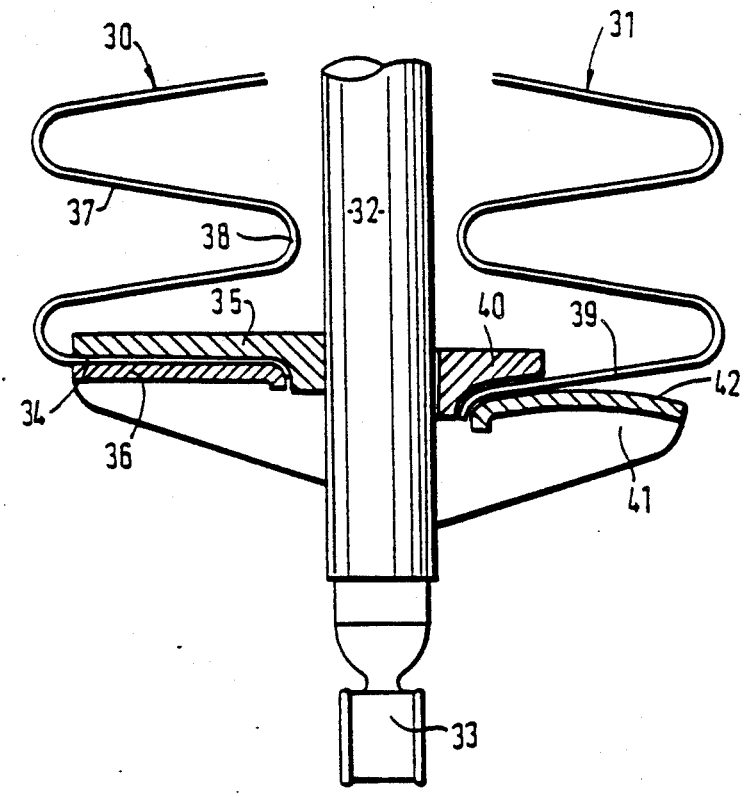
FIG. 5 shows two practical embodiments of spring assembly according to the invention.

Referring now to FIG. 5, this shows diagramatically two ways in which springs of the kind specified may be used in an assembly for a motor vehicle suspension. FIG. 5 shows an assembly of two springs 30, 31 of the kind specified disposed generally as mirror images of one another on opposite sides of a telescopic damper unit 32, the end (lowermost) limbs of the springs 30, 31 being held to the damper unit by respective mounting means which illustrate different embodiments of the invention. The illustrated part of the damper unit is provided with an attachment eye 33.

The illustrated end limb, 34, of spring 30 is held to the part 32 of the damper unit between upper and lower mounting members 35, 36 which may be in the form of brackets of which one is welded to the part 32 of the damper unit and the other releasably held by a fastener. As it is thus held, limb 34 extends substantially perpendicular to the axis of the damper unit, i.e. to the direction in which the spring is compressed in use. In the free state, limb 34 would be inclined to such direction, substantially parallel to the limb of the spring indicated at 37. Then, when the load on the spring is such that all the limbs thereof are substantially parallel to one another, the reflex portion of the spring indicated at 38 is not unduly deformed. Such installation of the spring 30 corresponds to the embodiment of the invention described theoretically above with relation to FIG. 4 of the drawings.

In the right hand part of FIG. 5 there is illustrated how the spring mounting may include a surface which is arranged to be progressively engaged by a spring end limb, to support the limb at a range of orientations which correspond to a range of spring loads in use. Spring 31 has an end limb 39 which is held at its free end between upper and lower mounting members 40, 41. The lower mounting member 41 has a curved upwardly presented surface 42. As the load on the spring increases, and the limbs thereof become more nearly parallel to one another, surface 42 is progressively engaged by limb 39 so that the limb is effectively supported, at the variable position where it first makes contact with surface 42, at a range of attitudes corresponding to the range of spring loads in use. Mounting member 41 may comprise a bracket, e.g. made of sheet metal, welded to the part 32 of the damper, and the upper mounting member 40 may be secured to the mounting member 41 by a suitable fastener so that the limb 39 is firmly held therebetween.

Figure 6A:
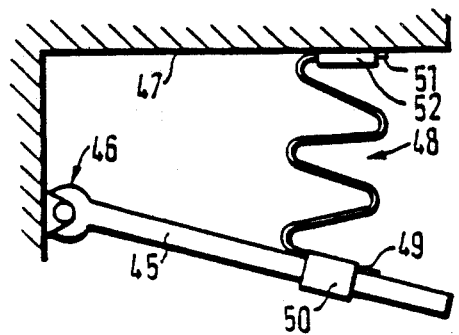
FIGS. 6a and 6b are is a diagrammatic perspective view of a further embodiment of spring assembly according to the invention.
Figure 6B:
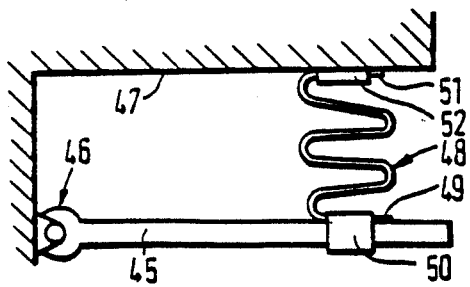

Referring now to FIGS. 6a, 6b of the drawings, there is shown diagrammatically an arm 45 pivotally supported, at a bearing 46, to a fixed structure 47 which may be part of the chassis structure (by which term we include an integral body-chassis structure) of a motor vehicle. The arm 45, which may be connected, either directly or indirectly, to a wheel carrier member at its free end, is sprung relative to the vehicle chassis structure 47 by a spring 48 of the kind specified. The spring 48 has one of its end limbs, 49, held to the arm 45 by a clamp 50, and the other of its end limbs, 51, held to the structure 47 by a suitable mounting member 52.

FIG. 6a represents a condition in which the spring is, substantially unloaded or in its free state, which position will correspond to that of maximum rebound of the arm 45 in a vehicle suspension.

FIG. 6b shows the position of arm 45 and the configuration of spring 48 at a condition which represents a mid-point in a range of permissible movement of arm 45. In this state, all the limbs of the spring 48 are substantially parallel to one another or are approaching such condition, with the arm 45 parallel to the part of the chassis structure 47 to which the limb 51 of the spring is secured. Therefore, between the positions shown in FIGS. 6a and 6b the relative changes in attitude of the spring limbs 49, 51 have corresponded substantially to those which would occur if such limbs were pin-jointed to the same members. Further deflection of the arm 45 above the position shown in FIG. 6b would further simulate the theoretical pin-jointed deflection of the spring limbs. Therefore, by arranging that the dimensions and configuration of the spring are substantially co-ordinated with the arcuate movement of arm 45 relative to structure 47, the theoretically ideal pin-jointed mounting of the end limbs of the spring has been simulated.

In FIGS. 6a and 6b, the end limbs 49, 51 of the spring are held parallel to the members to which they are mounted. It will be appreciated that they need not be parallel, but could be mounted at an inclination to such members to achieve the required geometrical relationship between spring deflection and relative movement of the members. Further, it will be appreciated that, in order to relate spring deflection to relative arcuate movement of members, the spring must have its end limbs falling in the same general direction transversely of the spring, i.e. there is an even number of limbs.

We claim:

1. An assembly for preventing excessive deformation of a spring, the spring being in the form of a strip of fibre-reinforced plastics material of zig-zag configuration, having a plurality of limbs (10, 11, 12, 13, 14, 15, 16) connected by reflex portions (17, 18, 19, 20, 21, 22) with the longitudinal centre line of the strip lying substantially in a single plane, into a shape in which all the reflex portions are deformed equally and the limbs are all parallel to one another at a particular value of applied load and which deformed shape the spring would develop were the end limbs (10, 16) pin-jointed at their midpoints for pivotal movement about respective axes (26, 27);

the assembly including a spring as defined above; and mounting means (23, 24) holding end ones (10, 16) of said limbs so that the spring acts resiliently therebetween and is stabilized against displacement transverse of the direction of a load applied to the spring, wherein the mounting means (23, 24) of at least one of said end limbs (10, 16) holds the respective limb at an attitude about the same as the attitude it would have at a mean value of spring load in use by having the limb pin-jointed to allow changes in attitude of the limb in use.

2. An assembly according to claim 1 wherein said attitude corresponds to a mean value of spring load in use.

3. An assembly according to claim 2 wherein said mounting means (23, 24; 35, 36) holds said at least one end limb (10, 16; 34) at an attitude substantially perpendicular to the direction of movement thereof in use, said limb being inclined to said direction when unconstrained by said mounting means.

4. An assembly according to claim 1 wherein said mounting means (40, 41) includes a surface (42) arranged to be progressively engaged by the respective limb (39) to support a part of the limb over a range of attitudes corresponding to a range of spring loads in use.

5. An assembly according to claim 1 wherein said mounting means (50, 52) are connected to members (45, 47) which are pivotable relative to one another, so that the mounting means undergo a relatively arcuate movement in use and the limbs (49, 51) held thereby undergo a change in relative attitude substantially corresponding to that which they would undergo if they were pin-jointed to such members.

6. An assembly according to claim 5 wherein one of said relatively pivotable members (45) is an arm forming part of a vehicle suspension.

7. An assembly according to claim 1 wherein said mounting means (23, 24; 35, 36) holds said at least one end limb (10, 16; 34) at an attitude substantially perpendicular to the direction of movement thereof in use, said limb being inclined to said direction when unconstrained by said mounting means.

* * * * *